United States Patent
Lin et al.

(10) Patent No.: US 10,710,203 B2
(45) Date of Patent: Jul. 14, 2020

(54) UNIVERSAL JIG FOR CLAMPING WIND TURBINE BLADES

(71) Applicant: Institute of Nuclear Energy Research, Atomic Energy Council, Executive Yuan, R.O.C., Taoyuan (TW)

(72) Inventors: Yu-Chu Lin, Taoyuan (TW); Yan-Ting Lin, Taoyuan (TW); Wei-Nian Su, Taoyuan (TW); Chin-Cheng Huang, Taoyuan (TW)

(73) Assignee: INSTITUTE OF NUCLEAR ENERGY RESEARCH, ATOMIC ENERGY COUNCIL, Taoyuan (TW)

( * ) Notice: Subject to any disclaimer, the term of this patent is extended or adjusted under 35 U.S.C. 154(b) by 261 days.

(21) Appl. No.: 15/950,248

(22) Filed: Apr. 11, 2018

(65) Prior Publication Data
US 2019/0314942 A1   Oct. 17, 2019

(51) Int. Cl.
*B23Q 3/06* (2006.01)
*F03D 13/40* (2016.01)

(52) U.S. Cl.
CPC .......... *B23Q 3/063* (2013.01); *B23Q 2703/10* (2013.01); *F03D 13/40* (2016.05)

(58) Field of Classification Search
CPC .......... B23Q 3/063; B23Q 3/06; B23Q 3/062; B25B 1/00; B25B 1/02; B25B 1/2457; B25B 5/02; B25B 5/14; F03D 13/40
USPC ....... 248/689, 555, 554, 644, 670, 672, 674, 248/675, 229.1, 229.12, 229.22, 231.41, 248/316.1, 316.4; 269/266, 21, 246
See application file for complete search history.

(56) References Cited

U.S. PATENT DOCUMENTS

| | | | | | |
|---|---|---|---|---|---|
| 2,722,867 A | * | 11/1955 | Dackor | ................. | B25B 1/2421 409/289 |
| 3,185,470 A | * | 5/1965 | Zitner | .................... | B23Q 3/069 269/91 |
| 3,818,646 A | * | 6/1974 | Peterson | ................ | B23Q 3/063 451/365 |
| 4,986,319 A | * | 1/1991 | Ahlefeld | ................. | F01P 3/202 141/363 |
| 5,224,690 A | * | 7/1993 | Vaught | ..................... | B23Q 3/06 269/48.3 |
| 6,295,722 B1 | * | 10/2001 | MacLeod | ............. | H02K 15/028 269/266 |

(Continued)

*Primary Examiner* — Terrell L McKinnon
*Assistant Examiner* — Michael McDuffie
(74) *Attorney, Agent, or Firm* — Demian K. Jackson; Jackson IPG PLLC

(57) ABSTRACT

A universal jig is provided for clamping wind turbine blades. The jig has a rectangle-like shape forming a space for clamping a blade at the blade root or the blade body. The jig comprises a set of vertically-moving parts; a set of horizontally-moving parts; a plurality of adjusted pads; and a plurality of positioning parts. The vertically-moving parts comprise two upper connecting posts and two lower connecting posts sheathed with each other separately to form two length sides of the jig. The horizontally-moving parts comprise two left connecting posts and two right connecting posts. The adjusted pads are locked on the left and the right connecting posts. The positioning parts are locked at the upper and the lower connecting posts of the length sides of the jig and are locked at the left and the right connecting posts of the width sides of the jig.

10 Claims, 6 Drawing Sheets

(56) References Cited

U.S. PATENT DOCUMENTS

| | | | | |
|---|---|---|---|---|
| 6,298,896 | B1* | 10/2001 | Sherrill | B29C 43/56 |
| | | | | 156/581 |
| 6,460,817 | B1* | 10/2002 | Bosson | A47B 21/0314 |
| | | | | 248/316.1 |
| 8,264,827 | B2* | 9/2012 | Yuan | F16B 5/0642 |
| | | | | 248/229.12 |
| 8,827,232 | B2* | 9/2014 | Crowley | A47B 43/003 |
| | | | | 211/175 |
| 9,022,337 | B2* | 5/2015 | Petruskavich | F16M 11/041 |
| | | | | 248/176.1 |
| 9,272,378 | B1* | 3/2016 | Miller | B23Q 37/005 |
| 2006/0108729 | A1* | 5/2006 | Siegel | B25B 1/08 |
| | | | | 269/266 |
| 2010/0133405 | A1* | 6/2010 | Jeon | B25J 15/0052 |
| | | | | 248/316.1 |
| 2012/0114443 | A1* | 5/2012 | Cyrus | B61D 3/16 |
| | | | | 410/44 |
| 2014/0353894 | A1* | 12/2014 | DesJardien | B23P 19/10 |
| | | | | 269/21 |
| 2014/0363252 | A1* | 12/2014 | Wawro | B23Q 3/06 |
| | | | | 409/225 |
| 2016/0144745 | A1* | 5/2016 | Saucier | B60N 2/0228 |
| | | | | 248/645 |
| 2018/0093782 | A1* | 4/2018 | Lofstrom | B32B 43/003 |
| 2019/0118318 | A1* | 4/2019 | Tai | B25B 1/2457 |
| 2019/0389017 | A1* | 12/2019 | Cross | B23Q 3/06 |

\* cited by examiner

UNIVERSAL JIG FOR CLAMPING WIND TURBINE BLADES

TECHNICAL FIELD OF THE INVENTION

The present invention relates to a jig for clamping a blade; more particularly, to a jig with adjustable length and width, where the contact points of the jig can be adjusted to be conformed with the shape of the blade for clamping.

DESCRIPTION OF THE RELATED ARTS

Blade is an important part of a wind turbine. But, the shapes of wind turbine blades are various. During manufacturing, storing, transporting, installing and hoisting the blades, jigs specifically made for the blades are required for clamping.

A Prior Art reveals a blade holder for a few flat blades and a manufacturing method thereof. Yet, it is not for clamping blades having radiant surfaces. U.S. Pat. No. 8,997,351 B2 reveals a non-metallic cover for a fixture. It is a fixture used on fabricating a turbine engine and yet is not a universal jig. U.S. Pat. No. 8,240,962 B2 reveals an integrated shipping fixture and assembly method for jointed wind turbine blades. Yet, it is a blade holder designed for transportation. U.S. Pat. No. 4,829,720 A reveals a turbine blade positioning fixture. It is a method for accurately positioning a turbine blade during grinding the root of a blade and yet is not a universal jig for clamping blade. U.S. Pat. No. 8,567,833 B2 reveals a blade lifting system with saloon doors. Yet, it is a system for hanging a wind turbine blade, which requires a block for clamping the blade and the block has a shape made according to the shape of the blade. A Prior Art reveals a universal jig for wind turbine blade. Yet, it has claws made according to different sectional blade shapes so that it cannot be directly applied to all blades.

Because feed-in price for purchasing wind power is increased, related industries actively install wind turbines and operate wind fields. Wind turbines become various and have blades of different shapes and sizes. Nevertheless, the above Prior Arts reveal jigs for specific blades. Since different wind turbines use different blades, the lengths, widths and shapes of the blades differ. When the number of blades of different sizes increases, the number of jigs required for clamping blades increases and higher cost and lower use rates are followed. Hence, the prior arts do not fulfill all users' requests on actual use.

SUMMARY OF THE INVENTION

The main purpose of the present invention is to provide a universal jig for clamping blades, which blades are used in wind turbines with different lengths, widths and shapes.

Another purpose of the present invention is to adjust the contact points of the universal jig to be conformed with the shapes of the blades for avoiding damages to the blades by averaging the forces received on the surfaces of the blades.

Another purpose of the present invention is to apply the universal jig in pull tests of the blades (in a design evaluation lab) for the (small) wind turbines for manufacturing, storing, transporting, installing and hoisting the blades of the wind turbines.

Another purpose of the present invention is to stack a number of blades by using the universal jigs for saving the storage space of a warehouse, where, during being transported by sea, railway or highway, the present invention can be coordinated with a base of a transportation automobile for locking to achieve security and space-saving.

Another purpose of the present invention is to increase the use rate of the universal jigs as the number of the universal jigs required is reduced, where the costs for manufacturing, installing and hoisting wind turbines are lowered for improving industrial efficiency.

To achieve the above purposes, the present invention is a universal jig for clamping wind turbine blades, which has a rectangle-like shape with a space to clamp a blade of a wind turbine, comprising a set of vertically-moving parts, a set of horizontally-moving parts, a plurality of adjusted pads and a plurality of positioning parts, where the rectangle-like shape has the vertically-moving parts at two first parallel sides; the vertically-moving parts comprises two upper connecting posts and two lower connecting posts and the upper connecting posts and the lower connecting posts are sheathed with each other separately; the upper connecting posts are separately arranged with the lower connecting posts into two columns to obtain first sliders; the upper and the lower connecting posts move up and down before being locked; each one of the upper and the lower connecting posts has at least one first positioning hole correspondingly; the rectangle-like shape has the horizontally-moving parts at two second parallel sides to be connected with the vertically-moving parts of the first parallel sides of the rectangle-like shape; the horizontally-moving parts comprises two left connecting beams and two right connecting beams and the left connecting posts and the right connecting posts are sheathed with each other separately; the left connecting beams are separately arranged with the right connecting beams into two rows to obtain second sliders; the upper and the lower connecting posts and the left and the right connecting beams are four sides of the rectangle-like shape to obtain the space; the left and the right connecting beams move left and right before being locked; each one of the left and the right connecting beams has at least one second positioning hole correspondingly; the adjusted pads are locked at the second positioning holes of the left and the right connecting beams; each one of the adjusted pads comprises a thread section, a pad section and a plurality of bolt nuts; the thread section comprises threads on an outer wall surface of each one of the adjusted pads; the thread section penetrates through and connects the left and the right connecting beams; the pad section is located on top of the thread section to contact with the blade by adjusting an angle of the pad section according to the length, the width and the shape of the blade; the bolt nuts are bolted on the thread section at a position in a direction, at a position in the opposite direction and at a position between the two positions to lock and position the adjusted pads so as to obtain corresponding relations with the blade and the left and the right connecting beams; every one of the adjusted pads has freedom on adjusting the three positions so that altogether two rows of the adjusted pads are adjusted according to cross-sectional curves of upper and lower surfaces of the blade; the adjusted pads are completely contacted with the surfaces of the blade so that curves obtained through bottoms of the adjusted pads in the two rows are consistent with cross-sectional curves of the upper and lower surfaces of the blade; the adjusted pads in the two rows are contacted with the blade simultaneously to fix the blade; the positioning parts lock the upper and the lower connecting posts at fixed positions through the at least one first positioning hole to change a length of every one of the first parallel sides; and the positioning parts lock the left and the right connecting beams at fixed positions through the at least one second positioning hole to change a length of every one of the second parallel sides. Accordingly, a novel universal jig for wind turbine blade is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
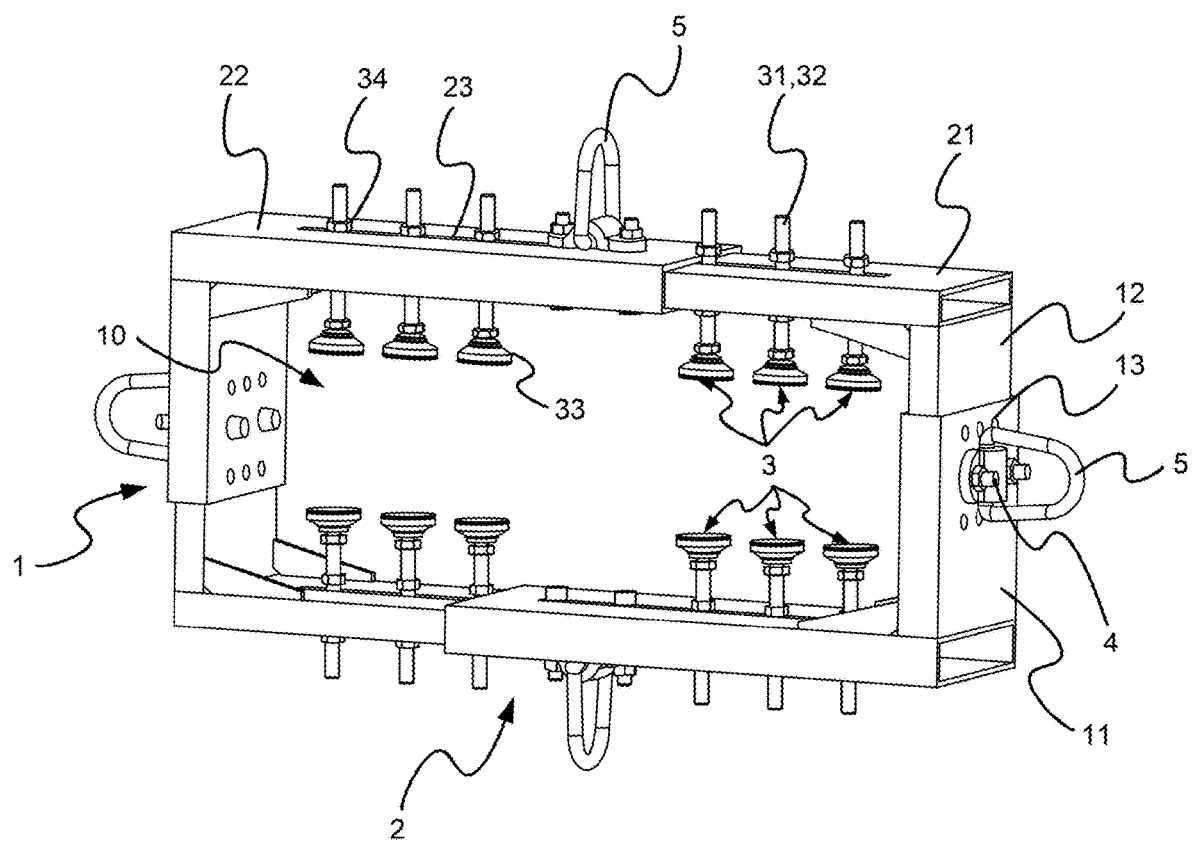
FIG. 1 is the structural view showing the preferred embodiment according to the present invention.
Figure 2:
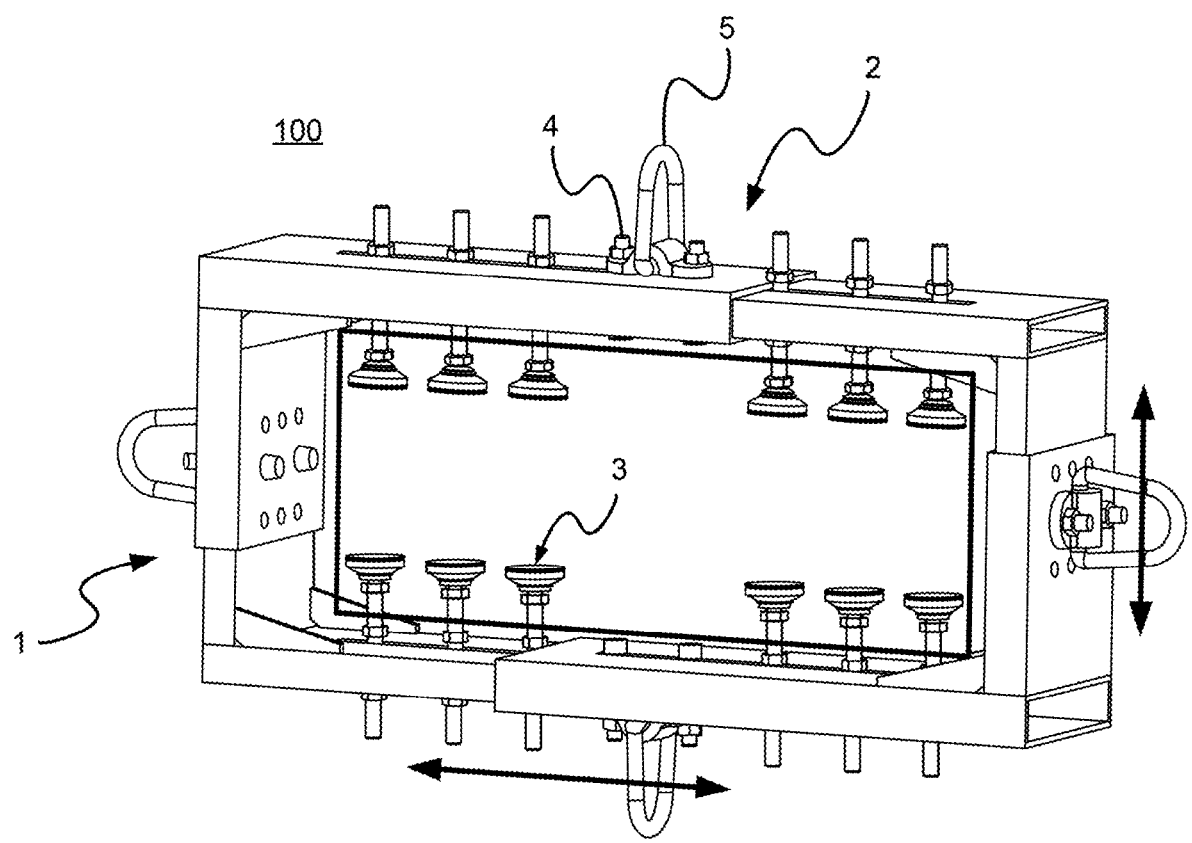
FIG. 2 is the view showing the adjustment of the present invention.

The following description of the preferred embodiment is provided to understand the features and the structures of the present invention.

Please refer to FIG. 1 to FIG. 6, which are a structural view showing a preferred embodiment according to the present invention; a view showing an adjustment of the present invention; views showing a width and a length of the present invention; a view showing an adjustment of an adjusted pad; and a view showing the present invention locked with different numbers of bolt rings. As shown in the figures, the present invention is a universal jig for clamping wind turbine blades, which has a rectangle-like shape with a space 10 for clamping a blade of a wind turbine at the root or the body of the universal jig 100. The universal jig 100 comprises a vertically-moving part 1, a horizontally-moving part 2, a plurality of adjusted pads 3, a plurality of locking bolts 4 and a plurality of bolt rings 5.

Figure 3:
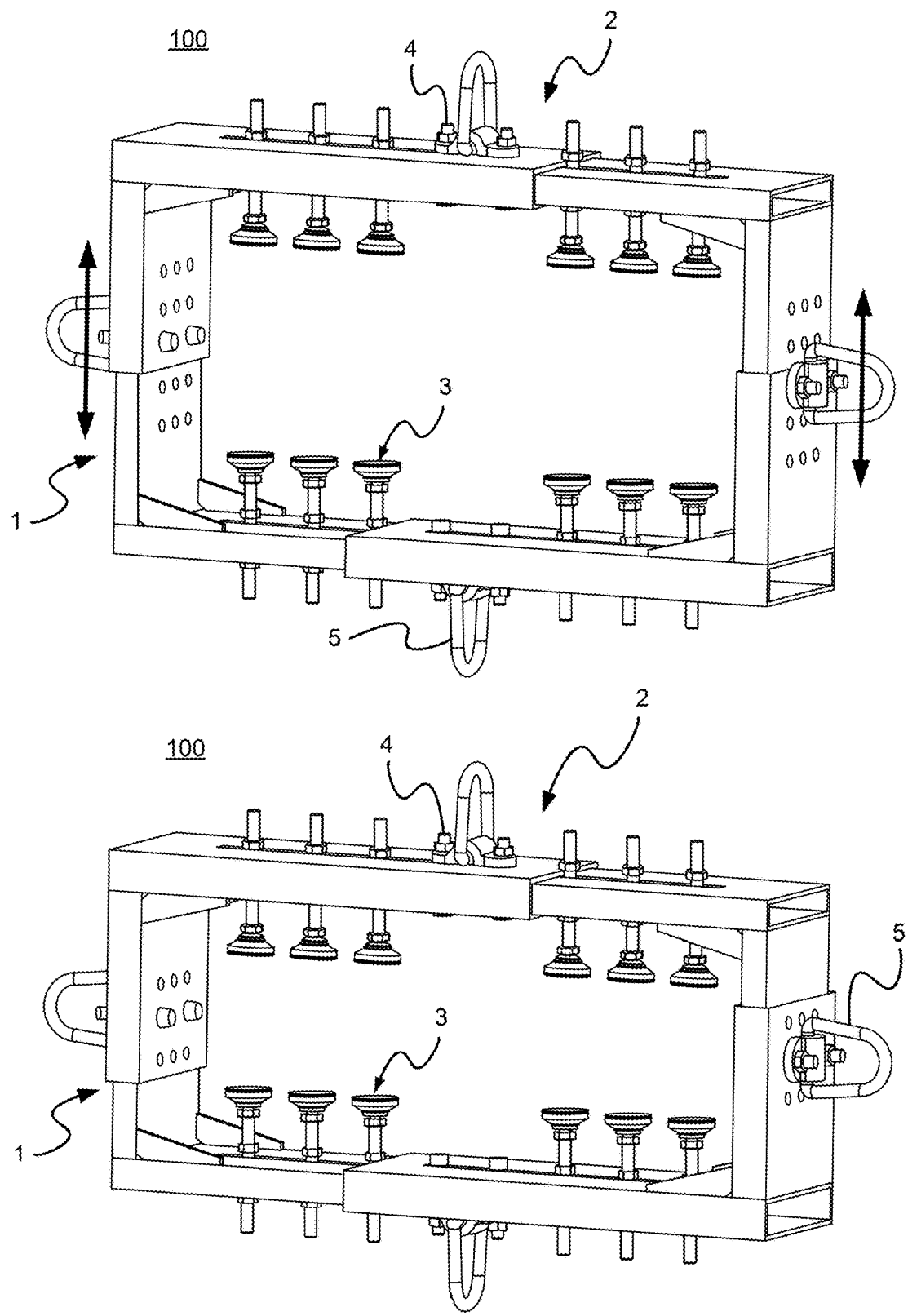
FIG. 3 is the view showing the width of the present invention.
Figure 4:
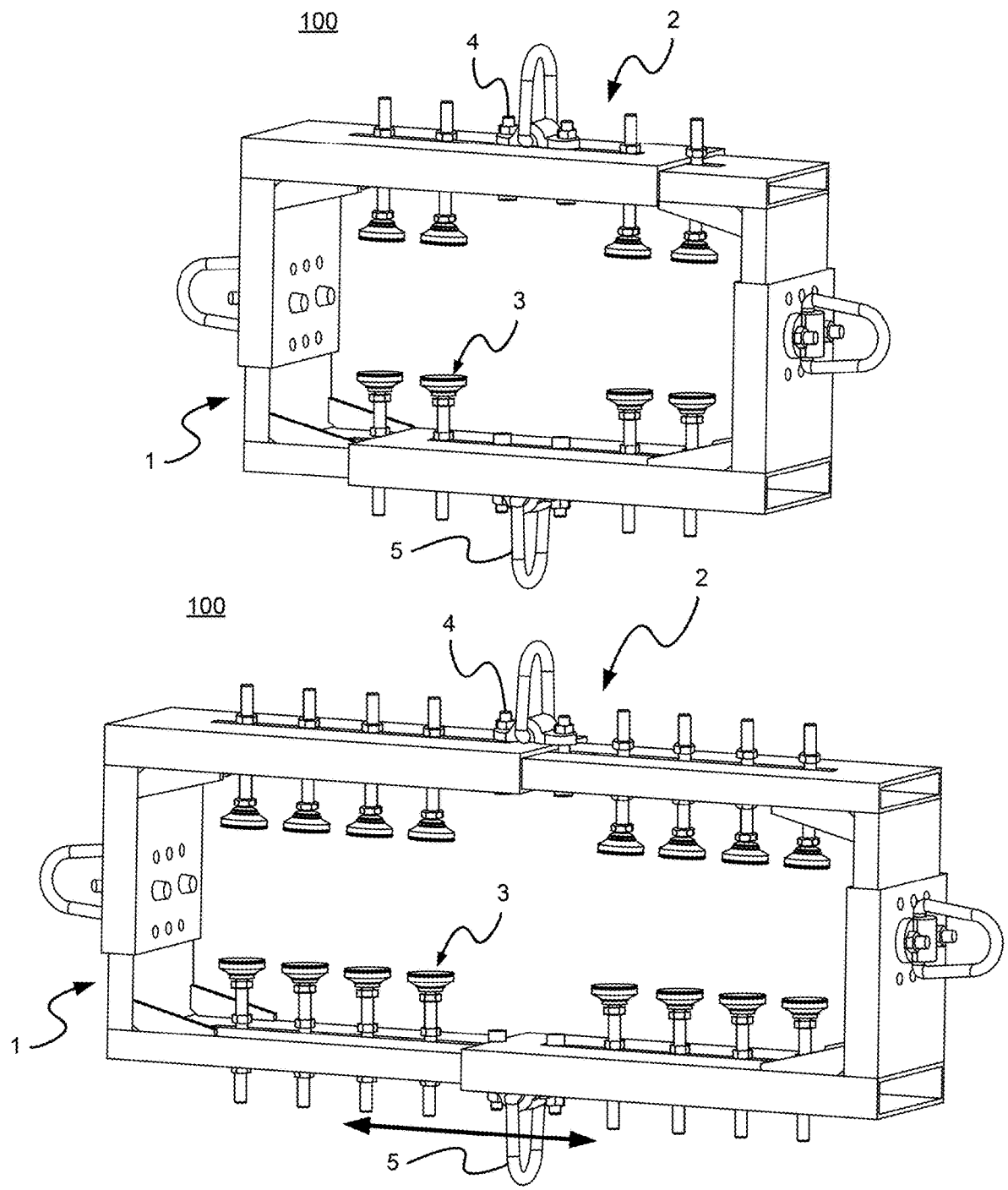
FIG. 4 is the view showing the length of the present invention.

The vertically-moving parts 1 form two width sides of the universal jig 100. The vertically-moving parts 1 comprises two upper connecting posts 11 and two lower connecting posts 12 sheathed with each other separately. The upper and the lower connecting posts 11,12 are arranged into two columns and deposed in two vertically opposite directions respectively to obtain first sliders. The upper and the lower connecting posts 11,12 can move up and down before being locked. Each one of the upper and the lower connecting posts 11,12 is correspondingly set with several bolting holes 13 where the bolting holes 13 are arranged into a plurality of rows with interval in between. With coordination of the bolting holes 13, the upper and the lower connecting posts 11,12 can be locked by using the locking bolts 4 or the bolt rings 5. Thus, the width of the universal jig 100 is adjusted to meet requirement in actual use, as shown in FIG. 3. Therein, the way for mutually sheathing the upper and the lower connecting posts 11,12 can be that the lower connecting post 12 is sheathed into the upper connecting post 11 or the upper connecting post 11 is sheathed into the lower connecting post 12. The first way is applied in the preferred embodiment.

The horizontally-moving part 2 form two length sides of the universal jig 100 and are connected with the vertically-moving parts 1 of the width sides. The horizontally-moving parts 2 comprises two left connecting beams 21 and two right connecting beams 22 sheathed with each other separately. The left and the right connecting beams 21,22 are arranged into two rows and deposed in two horizontally opposite directions respectively to obtain second sliders. The left and the right connecting beams 21,22 can move left and right before being locked. The upper and the lower connecting posts 11,12 and the left and the right connecting beams 21,22 are four sides of the rectangle-like shape to form the space 10. Each one of the left and the right connecting beams 21,22 is set with an elongate hole 23 correspondingly. After adjusting the positions of the left and the right connecting beams 21,22, the locking bolts 4, the bolt rings 5 or the adjusted pads 3 are used to lock the left and the right connecting beams 21,22. Thus, the length of the universal jig 100 is adjusted to meet requirement in actual use, as shown in FIG. 3. Therein, the way for mutually sheathing the left and the right connecting beams 21,22 can be that the left connecting beam 21 is sheathed into the right connecting beam 22 or the right connecting beam 22 is sheathed into the left connecting beam 12. The first way is applied in the preferred embodiment.

Thus, the width and length of the universal jig 100 are adjustable and switchable according to actual use. The adjustment is done with free movement by using the bolting holes 13 along with the coordination of (or by completely using) the elongate holes 23.

Figure 5:
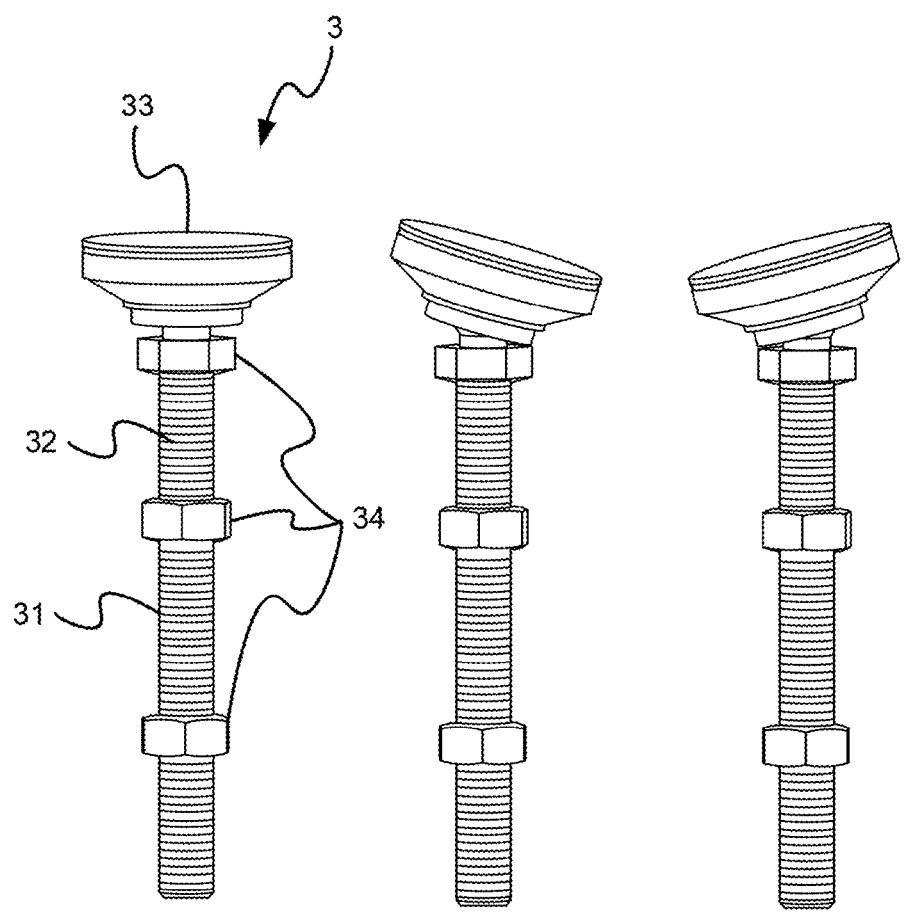
FIG. 5 is the view showing the adjustment of the adjusted pad.

As shown in FIG. 5, the adjusted pads 3 are locked at the elongate holes 23 of the left and the right connecting beams 21,22 at the length sides of the universal jig 100. Each one of the adjusted pads 3 comprises a thread section 31, a pad section 33 and a plurality of bolt nuts 34; the thread section 31 comprises threads 32 on an outer wall surface; the pad section 33 is set on top of the thread section 31 to contact with the blade by adjusting an angle of the pad section 31 according to the length, the width and the shape of the blade; the thread section 31 penetrates through and connects the left and the right connecting beams 21,22; and the bolt nuts 34 are bolted on the thread section 31 at a position in a direction, at a position in the opposite direction and at a position between the above two positions to position and lock the adjusted pad 3 so as to obtain corresponding relations with the blade and the left and the right connecting beams 21,22. The positions and the number of the adjusted pads at the left and the right connecting beams 21,22 are adjustable; the distances between bottoms of the adjusted pads 3 and the left and the right connecting beams 21,22 are adjustable; and the angles between the pad sections 33 and the thread sections 31 of the adjusted pads 3 are adjustable. With the three positions adjusted according to the length, the width and the shape of the blade, the adjusted pads 3 obtains freedom on adjusting their positions. The adjusted pads 3 in two rows are adjusted according to upper and lower cross-sectional surface curves of the blade for completely contacting the adjusted pads 3 with the surfaces of the blade. Therein, curves obtained through bottoms of the adjusted pads 3 in the two rows are consistent with cross-sectional curves of the upper and lower surfaces of the blade. The adjusted pads 3 in the two rows are adjusted to contact with the blade simultaneously to fix the blade. Thus, a novel universal jig for clamping a wind turbine blade is obtained.

Figure 6:
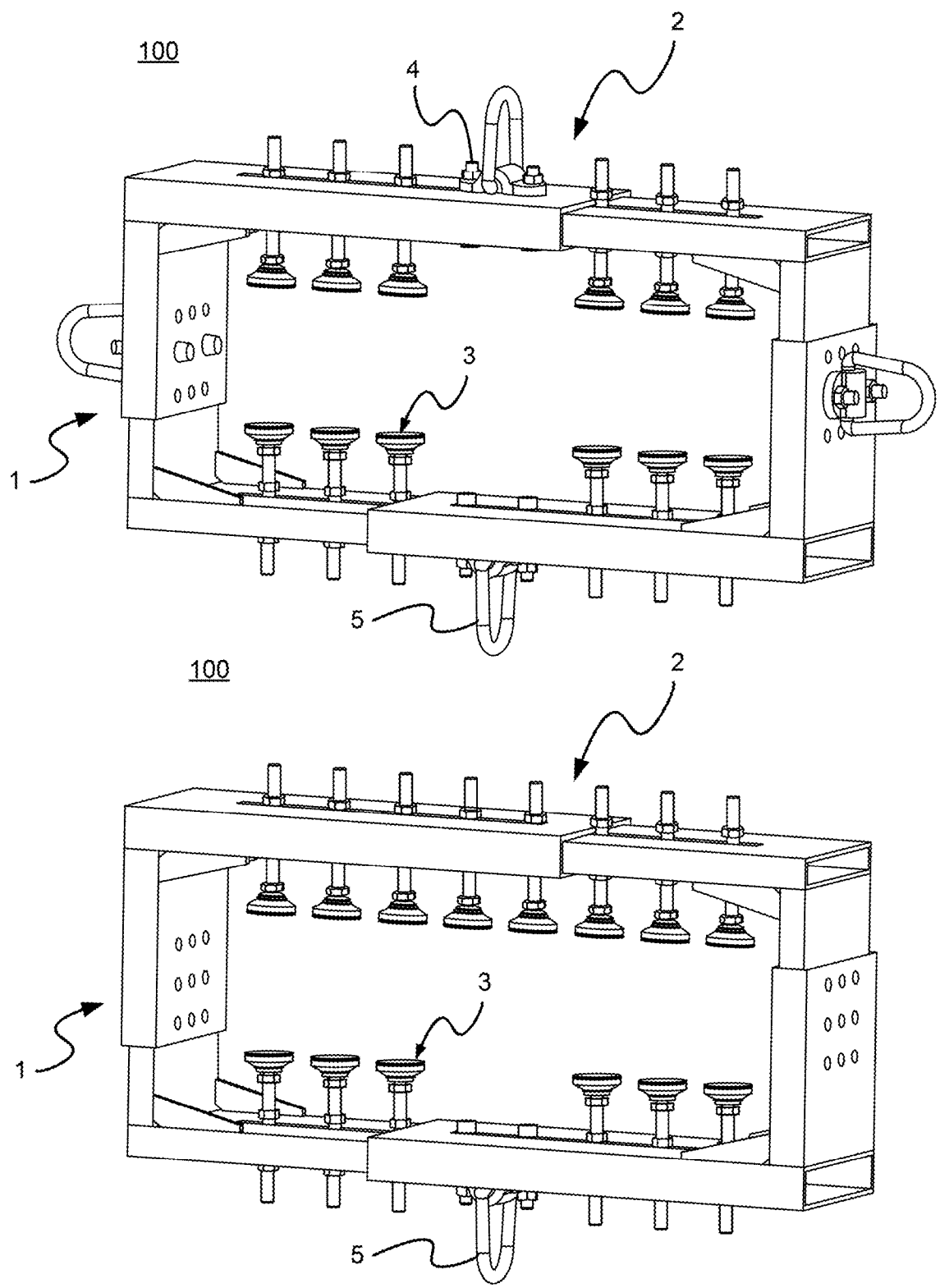
FIG. 6 is the view showing the present invention locked with different numbers of the bolt rings.

As shown in FIG. 6, on using the present invention, the bolt rings 5 can locked at the four sides of the universal jig 100, where the bolt rings 5 are not locked or a different number of bolt rings 5 are locked according to a requirement. Hence, during being manufactured, stored, transported, installed and hoisted, the blade can be locked with a different number of the bolt rings 5.

When the bolt rings 5 are not locked, the universal jig 100 is used as a frame for deposing the blade. Through locking the universal jig 100 with the adjusted pads 3, a number of the blades can be stacked for saving the storage space of a warehouse. During being transported by sea, railway or highway, the present invention can be coordinated with a base of a transportation automobile for locking to achieve security and space-saving.

The main features of the present invention are as follows:

1. The universal jig can clamp a blade of a wind turbine, which blade has different length, width and shape.

2. The contact points of the universal jig can be adjusted to be conformed with the shape of the blade for avoiding damage to the blade by averaging the force received by the surfaces of the blade.

3. The universal jig can be applied in a pull test of the blade (in a design evaluation lab) for the (small) wind turbine for manufacturing, storing, transporting, installing and hoisting the blade of the wind turbine.

4. By using the universal jigs, a number of the blades can be stacked for saving the storage space of a warehouse; and, furthermore, during being transported by sea, railway or highway, the present invention can be coordinated with a base of a transportation automobile for locking to achieve security and space-saving.

5. The use rate of the universal jigs increases as the number of the universal jigs required is reduced, where the cost for manufacturing, installing and hoisting the wind turbine is lowered for improving industrial efficiency.

To sum up, the present invention is a universal jig for clamping wind turbine blades, where the length and width of the universal jig can be freely adjusted; the contact points of the universal jig can be adjusted to be conformed with the shape of a blade for clamping; the universal jig can clamp a blade of different length, width and shape for a wind turbine; the use rate of the universal jig is increased as the number of the universal jig required is reduced; and the cost for manufacturing, installing and hoisting a wind turbine is lowered for improving industrial efficiency.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A universal jig for clamping wind turbine blades, which has a rectangle-like shape with a space to clamp a blade of a wind turbine, comprising:
   a set of vertically-moving parts,
      wherein the rectangle-like shape has said vertically-moving parts at two first parallel sides;
      wherein said vertically-moving parts comprises two upper connecting posts and two lower connecting posts and said upper connecting posts and said lower connecting posts are sheathed with each other separately;
      wherein said upper connecting posts are separately arranged with said lower connecting posts into two columns to obtain first sliders;
      wherein said upper and said lower connecting posts move up and down before being locked; and
      wherein each one of said upper and said lower connecting posts has at least one first positioning hole correspondingly;
   a set of horizontally-moving parts,
      wherein said rectangle-like shape has said horizontally-moving parts at two second parallel sides to be connected with said vertically-moving parts of said first parallel sides of said rectangle-like shape;
      wherein said horizontally-moving parts comprises two left connecting beams and two right connecting beams and said left connecting posts and said right connecting posts are sheathed with each other separately;
      wherein said left connecting beams are separately arranged with said right connecting beams into two rows to obtain second sliders;
      wherein said upper and said lower connecting posts and said left and said right connecting beams are four sides of said rectangle-like shape to obtain said space;
      wherein said left and said right connecting beams move left and right before being locked; and
      wherein each one of said left and said right connecting beams has at least one second positioning hole correspondingly;
   a plurality of adjusted pads,
      wherein said adjusted pads are locked at said second positioning holes of said left and said right connecting beams;
      wherein each one of said adjusted pads comprises a thread section, a pad section and a plurality of bolt nuts; said thread section comprises threads on an outer wall surface of each one of said adjusted pads; said thread section penetrates through and connects said left and said right connecting beams; said pad section is located on top of said thread section to contact with said blade by adjusting an angle of said pad section according to said length, said width and said shape of said blade; and said bolt nuts are bolted on said thread section at a position in a direction, at a position in the opposite direction and at a position between said two positions to lock and position said adjusted pads so as to obtain corresponding relations with said blade and said left and said right connecting beams; and
      wherein every one of said adjusted pads has freedom on adjusting said three positions so that two rows of said adjusted pads are altogether adjusted according to cross-sectional curves of upper and lower surfaces of said blade; said adjusted pads are completely contacted with said surfaces of said blade so that curves obtained through bottoms of said adjusted pads in said two rows are consistent with cross-sectional curves of said upper and lower surfaces of said blade; and said adjusted pads in said two rows are contacted with said blade simultaneously to fix said blade; and
   a plurality of positioning parts,
      wherein said positioning parts lock said upper and said lower connecting posts at fixed positions through said at least one first positioning hole to change a length of every one of said first parallel sides; and said positioning parts lock said left and said right connecting beams at fixed positions through said at least one second positioning hole to change a length of every one of said second parallel sides.

2. The universal jig according to claim 1, wherein said first and said second positioning holes are bolting holes with intervals in between to be arranged into a plurality of rows.

3. The universal jig according to claim 1,
wherein said first and said second positioning holes are elongate holes.

4. The universal jig according to claim 1,
wherein each one of said first and the second positioning holes are elongate holes and bolting holes with intervals in between to be arranged into a plurality of rows.

5. The universal jig according to claim 1,
wherein said positioning parts are locking bolts.

6. The universal jig according to claim 1,
wherein said positioning parts are bolt rings.

7. The universal jig according to claim 1,
wherein said positioning parts are locking bolts and bolt rings.

8. The universal jig according to claim 1,
wherein said freedom on adjusting said three positions comprises freedom on adjusting (a) positions and the number of said adjusted pads at said left and said right connecting beams;
(b) distances between bottoms of said adjusted pads and said left and said right connecting beams; and
(c) angles between said pad sections of said adjusted pads and said thread sections of said adjusted pads; and wherein said three positions are adjusted according to the length, the width and the shape of said blade.

9. The universal jig according to claim 1,
wherein said upper connecting posts and said lower connecting posts in said two columns are deposed in two vertically opposite directions respectively.

10. The universal jig according to claim 1,
wherein said left connecting beams and said right connecting beams in said two rows are deposed in two horizontally opposite directions respectively.

* * * * *